United States Patent
Galkowski et al.

(10) Patent No.: US 8,078,361 B2
(45) Date of Patent: Dec. 13, 2011

(54) METHOD AND DEVICE FOR ASSISTING A MOTOR VEHICLE SERVER IN THE VEHICLE STABILIZATION

(75) Inventors: Fred Galkowski, Gabsheim (DE); Thomas Berthold, Darmstadt (DE); Thomas Raste, Oberursel (DE); Urs Bauer, Ludwigsburg (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 978 days.

(21) Appl. No.: 10/581,834

(22) PCT Filed: Dec. 3, 2004

(86) PCT No.: PCT/EP2004/053272
§ 371 (c)(1),
(2), (4) Date: May 16, 2007

(87) PCT Pub. No.: WO2005/054040
PCT Pub. Date: Jun. 16, 2005

(65) Prior Publication Data
US 2008/0040002 A1 Feb. 14, 2008

(30) Foreign Application Priority Data
Dec. 4, 2003 (DE) .................... 103 57 045

(51) Int. Cl.
*B62D 6/00* (2006.01)
(52) U.S. Cl. ........... 701/42; 701/41; 180/446; 188/350; 303/146; 303/147; 303/148; 303/149; 303/150
(58) Field of Classification Search ............. 701/41–44; 180/442, 446; 188/350; 303/146–150
See application file for complete search history.

(56) References Cited

U.S. PATENT DOCUMENTS

| | | | | |
|---|---|---|---|---|
| 6,085,860 A * | 7/2000 | Hackl et al. | ............ | 180/443 |
| 6,226,579 B1 * | 5/2001 | Hackl et al. | ............ | 701/41 |
| 6,250,419 B1 * | 6/2001 | Chabaan et al. | ............ | 180/443 |
| 6,293,366 B1 * | 9/2001 | Chabaan et al. | ............ | 180/446 |
| 6,425,454 B1 * | 7/2002 | Chabaan et al. | ............ | 180/443 |
| 6,712,175 B2 * | 3/2004 | Kind et al. | ............ | 180/402 |
| 6,802,226 B2 * | 10/2004 | Ono et al. | ............ | 73/862.325 |
| 6,895,318 B1 * | 5/2005 | Barton et al. | ............ | 701/42 |
| 6,968,920 B2 * | 11/2005 | Barton et al. | ............ | 180/446 |
| 2004/0148080 A1 * | 7/2004 | Ekmark et al. | ............ | 701/41 |
| 2005/0189163 A1 * | 9/2005 | Barton et al. | ............ | 180/446 |

FOREIGN PATENT DOCUMENTS

| | | |
|---|---|---|
| DE | 19912169 | 7/2000 |
| DE | 10032340 | 1/2002 |
| DE | 10039782 | 2/2002 |
| DE | 10115018 | 11/2002 |
| EP | 1125823 | 8/2001 |
| EP | 1348610 | 10/2003 |
| WO | 02074607 | 9/2002 |
| WO | 02074638 | 9/2002 |
| WO | WO 02074638 A1 * | 9/2002 |

* cited by examiner

*Primary Examiner* — Thomas Black
*Assistant Examiner* — Peter D Nolan

(57) ABSTRACT

Disclosed is a method for assisting an operator of a vehicle in adjusting a nominal steering angle at steerable wheels of the vehicle for the vehicle stabilization. An additional steering torque is applied to the steering line of the vehicle, which is determined dependent on a difference between a nominal steering angle and an instantaneous steering angle. The method is characterized in that a value of a load moment acting on the steering line of the vehicle is estimated, and that the additional steering torque is established dependent on the estimated value for the load moment.

16 Claims, 8 Drawing Sheets

270

METHOD AND DEVICE FOR ASSISTING A MOTOR VEHICLE SERVER IN THE VEHICLE STABILIZATION

This application is the U.S. national phase of international application PCT/EP04/53272 filed Dec. 3, 2004, which designated the U.S. and which claims the benefit of priority of German Patent Application Number 10 357 045.4 filed Dec. 4, 2003. The contents of each of the aforementioned documents are incorporated herein in their entirety.

BACKGROUND OF THE INVENTION

The invention relates to a method for assisting an operator of a vehicle in adjusting a nominal steering angle at steerable wheels of the vehicle for the vehicle stabilization, wherein an additional steering torque is applied to the steering line of the vehicle, which is determined dependent on a difference between a nominal steering angle and an instantaneous steering angle.

Further, the invention relates to a device for assisting an operator of a vehicle in adjusting a nominal steering angle on at least one steerable wheel of the vehicle, comprising a means for adjusting an additional steering torque, which is determined by a control unit dependent on a difference between the nominal steering angle and an instantaneous steering angle.

When braking on an inhomogeneous roadway with different coefficients of friction on the left and the right longitudinal side of the vehicle, asymmetric brake forces may develop which cause a yaw torque that will induce rotational movement of the vehicle about its vertical axis. To prevent the vehicle from skidding, the driver is required to build up a compensating yaw torque by way of appropriate steering movements, said yaw torque counteracting the torque caused by the asymmetric brake forces. As this occurs, locking of the wheels should be avoided also on the vehicle side with the low coefficient of friction because the major reduction of the transmittable cornering force of a wheel, which comes along with wheel lock, can prevent the development of the necessary compensation torque. The situation at topic, hence, places high demands which regularly asks too much of inexperienced drivers in particular.

In vehicles with an anti-lock system (ABS), a controller prevents the wheels from locking. In situations of the type mentioned, a control strategy that is generally used has the objective of effectively decelerating the vehicle by way of a maximum high brake pressure in the wheel brakes on the vehicle side exhibiting the higher coefficient of friction, on the one hand. On the other hand, the driver must not be overloaded by a yaw torque caused due to different brake forces on the side with high and low coefficients of friction. Therefore, in the situations at topic, the control is carried out in such a manner that a difference between the brake pressures on the side with high and low coefficients of friction at the front axle of the vehicle develops only slowly in order to impart sufficient time to the driver to perform stabilizing steering movements. In addition, the brake pressure at both wheel brakes of the rear axle is limited to the value admitted for the low coefficient-of-friction side ('select low') to allow a sufficient rate of cornering force to build up at the rear axle, with a view to stabilizing the vehicle by steering interventions.

The presented measures enable the driver to master the vehicle easily, however, the coefficient-of-friction potential of the high coefficient-of-friction side is not optimally utilized to decelerate the vehicle. Therefore, it has been proposed to include the steering angle of the steerable wheels of the vehicle into driving stability control and to have a controller and an appropriate actuator actuated by the latter adjust a steering angle, which brings about the necessary compensation yaw torque. The vehicle may thus be stabilized more quickly and more reliably so that a more 'aggressive' ABS control strategy can be chosen, which permits a more effective brake intervention and consequently a quicker deceleration of the vehicle. Also, it is avoided that the vehicle will be skidding due to insufficient or misdirected steering interventions of the driver.

International patent application WO 02/074638 A1 discloses applying an additional steering torque to the steering line of the vehicle, which is established from a deviation between the steering angle that is adjusted by the driver and a steering angle requirement, and which is set by an electronic power steering system. The steering angle requirement is determined from the estimated yaw torque that acts on the vehicle, the yaw rate of the vehicle, and the lateral acceleration of the vehicle.

The result is that the steering angle that is determined by the control unit is not adjusted directly, but the additional steering torque assists the driver when adjusting the steering angle.

However, the problem encountered in a control of this type involves that the additional steering torque will adopt excessively high values in a braking operation on a roadway with low coefficients of friction when the control is tuned to high coefficients of friction. When the control is tuned to low coefficients of friction, the additional steering torque is too low when braking on a roadway with high coefficients of friction in order to assist the driver effectively. This may cause erroneous or inappropriate steering interventions of the driver, which is frequently noticed as being uncomfortable.

In view of the above, an object of the invention involves improving a method of the same type to such extent that the vehicle can be stabilized more reliably and more comfortably in a large number of possible driving situations.

SUMMARY OF THE INVENTION

According to the invention, this object is achieved by a method for assisting an operator of a vehicle in adjusting a nominal steering angle at steerable wheels of the vehicle for vehicle stabilization. In the method, an additional steering torque is applied to the steering line of the vehicle, which is determined dependent on a difference between a nominal steering angle and an instantaneous steering angle. A value of the load moment acting on the steering line of the vehicle is estimated and the additional steering torque is established dependent on the estimated value for the load moment. The object is also achieved by a device for assisting an operator of a vehicle in adjusting a nominal steering angle on at least one steerable wheel of the vehicle for vehicle stabilization. The device has a control unit for determining a deviation between a nominal steering angle and an instantaneous steering angle of the vehicle; a torque adjusting device that adjusts an additional steering torque, wherein the additional steering torque is determined based on deviation between the nominal steering angle and the instantaneous steering angle; one or more sensors mounted in the steering line of the motor vehicle; an estimation device for estimating a load moment that acts on the steering line based on signals from the one or more sensors mounted in the steering line of the motor vehicle; a device for establishing at least one component of the additional steering torque for the estimated load moment; and an adder for adding the additional steering torque to the steering torque established by the deviation between the nominal steering angle and the instantaneous steering angle, wherein the torque adjusting device is driven by an output of the adder.

The invention provides a method of assisting an operator of a vehicle in adjusting a nominal steering angle at steerable wheels of the vehicle for the vehicle stabilization, wherein an additional steering torque is applied to the steering line of the vehicle, which is determined dependent on a difference between a nominal steering angle and an instantaneous steering angle, the said method manifesting itself by the feature that a value of a load moment acting on the steering line is estimated, and that the additional steering torque is established dependent on the estimated value for the load moment.

The load moment concerns in particular a tire resetting moment, which acts on the steering line of the vehicle and is produced by cornering or lateral forces at the tires of the steerable wheels of the vehicle.

Consideration of the load moment also enables taking into account the instantaneous road condition in the control interventions. More particularly, there results a differing load moment for different coefficients of friction so that the value of the additional steering torque can be adapted to the coefficients of friction. In the presence of an inhomogeneous roadway, the method of the invention favorably permits taking into account the load moment that is caused in the sum by the tires being on different coefficients of friction.

It is arranged for in a favorable embodiment of the invention that the additional steering torque is composed of at least two additive components, a first component being determined dependent on the difference between the nominal steering angle and the instantaneous steering angle, while a second component is established dependent on the estimated value of the load moment.

This condition allows determining the control component of the additional steering torque derived from the steering angle deviation and the component established from the load moment, which can be considered a disturbance component, independently of each other, so that a steering angle controller employed can be designed in a very simple and reliable fashion.

The load moment is estimated by a disturbance variable observer unit in a particularly suitable embodiment of the invention.

In another favorable embodiment of the invention, it is provided that a component of the nominal steering angle is determined in an inverse vehicle model dependent on a disturbance yaw torque.

It is hence rendered possible to determine the nominal steering angle in such a fashion as to compensate the disturbance yaw torque, which is caused by differing brake forces in a braking operation on an inhomogeneous roadway.

However, it has shown that the vehicle cannot always be stabilized reliably by an adjustment of this component of the nominal steering angle. This may be due to errors in determining the disturbance yaw torque, for example.

In a favorable embodiment of the invention, another component of the nominal steering torque is therefore determined dependent on the deviation between a yaw angle of the vehicle and a predetermined value of the yaw angle.

Due to this component of the nominal steering angle, it is possible to take the reaction of the vehicle to changes of the steering angle into consideration, with a view to stabilizing the vehicle in an especially effective manner. It has proven especially favorable to characterize the vehicle reaction using the yaw angle.

Particularly in a braking operation on an inhomogeneous roadway while cornering, it is favorably provided that a component of the nominal steering angle is an estimated track steering angle.

In another favorable embodiment of the invention, it is provided that a component of the additional steering torque has a predefined amount. This component is determined irrespective of the amount of the nominal steering angle.

Preferably, the component of the additional steering torque with the predefined amount is set for a predetermined duration after the start of a braking operation on an inhomogeneous roadway, and is then withdrawn.

This component of the additional steering torque can provide the driver of the vehicle with a haptic signal indicating the existence of a braking situation on an inhomogeneous roadway. This signal is withdrawn in order to allow the driver a simple adjustment of the nominal steering angle by way of control components of the additional steering torque.

In addition, the invention provides a favorable device for implementing the method of the invention.

The device for assisting an operator of a vehicle in adjusting a nominal steering angle on at least one steerable wheel of the vehicle for the vehicle stabilization, comprising a means for adjusting an additional steering torque, which is determined by a control unit dependent on a deviation between the nominal steering angle and an instantaneous steering angle of the vehicle manifests itself by the feature that an estimation means is provided for estimating a load moment that acts on the steering line based on signals of sensors mounted in the steering line, with the estimation means being connected to another means which establishes a component of the additional steering torque for the load moment from the results of estimation established in the estimation means, the said additional steering torque being added by an adder to the steering torque established by the control unit, and with the means for adjusting the additional steering torque being driven by the output signal of the adder.

The sensors in an appropriate embodiment of the invention at least refer to one steering angle sensor, a sensor for measuring a hand steering torque representative of the driver's steering request, and a sensor for measuring the additional steering torque.

In a particularly favorable embodiment of the invention, the estimation means for estimating the load moment is designed as a disturbance variable observer unit.

In another favorable embodiment of the invention, the means for adjusting the additional steering torque concerns a servo motor of an electric power steering system.

This motor is provided already in a large number of vehicles so that the device can be made available in these vehicles in an especially simple fashion.

In a likewise advantageous embodiment of the invention, the means for adjusting the additional steering torque concerns a hydraulic power steering system.

In still another advantageous embodiment of the invention, the means for adjusting the additional steering torque concerns a steer-by-wire steering system.

To introduce the haptic signal about the existence of a braking situation on an inhomogeneous roadway, in still another favorable embodiment, the device includes a pilot control means, which connects to the adder and transmits an additional steering torque with a predetermined value to the adder for a predetermined duration.

To detect a braking operation on an inhomogeneous roadway and to activate the driver assist system, the device in a likewise preferred embodiment comprises detection means for detecting a driving condition, which dependent on a detected driving condition submits an activation signal to a multiplier that multiplies the activation signal by the additional steering torque established.

Suitably, the activation signal adopts the value 1 when the detection means identifies a braking operation on an inhomogeneous roadway.

Although suitable and advantageous embodiments of the invention arrange for assisting the driver during a braking operation on an inhomogeneous roadway, the invention is by no means limited to these applications. It may likewise be favorably implemented in an application where the additional steering torque is applied during any other unstable driving situation, for example, during an oversteering or understeering situation.

Further advantages and appropriate improvements of the invention can be seen in the subsequent description of preferred embodiments, making reference to the Figures.

BRIEF DESCRIPTION OF THE DRAWINGS

Referring to the Figures.

DETAILED DESCRIPTION OF THE DRAWINGS

The invention is based on a two-axle, four-wheel motor vehicle with steerable wheels on a front axle. The steering system of the vehicle is preferably a rack-and-pinion steering system, which is equipped with an electric power steering system. In the conventional operation of the power steering system, an EPS servo motor (EPS=Electric Power Steering) is used to apply an additional torque to the steering line, which boosts the steering torque applied by the driver. The steering request of the driver is determined by way of a hand steering moment $M_H$, which is measured by means of a torsion rod fitted into a steering rod of the steering system.

The electric power steering system is used to adjust an additional steering torque request $M_{DSR}$ (DSR=Driver Steering Recommendation) for assisting the driver, and is actuated to this end by a controller, e.g. by way of an interface to the CAN bus of the vehicle. The EPS servo motor is then used as an actuator which introduces the steering torque $M_{DSR}$ (DSR=Driver Steering Recommendation) into the steering line.

However, the invention can be implemented in a similar way also in vehicles with other types of steering systems such as steering systems with hydraulic power steering or with steer-by-wire steering.

Figure 1:
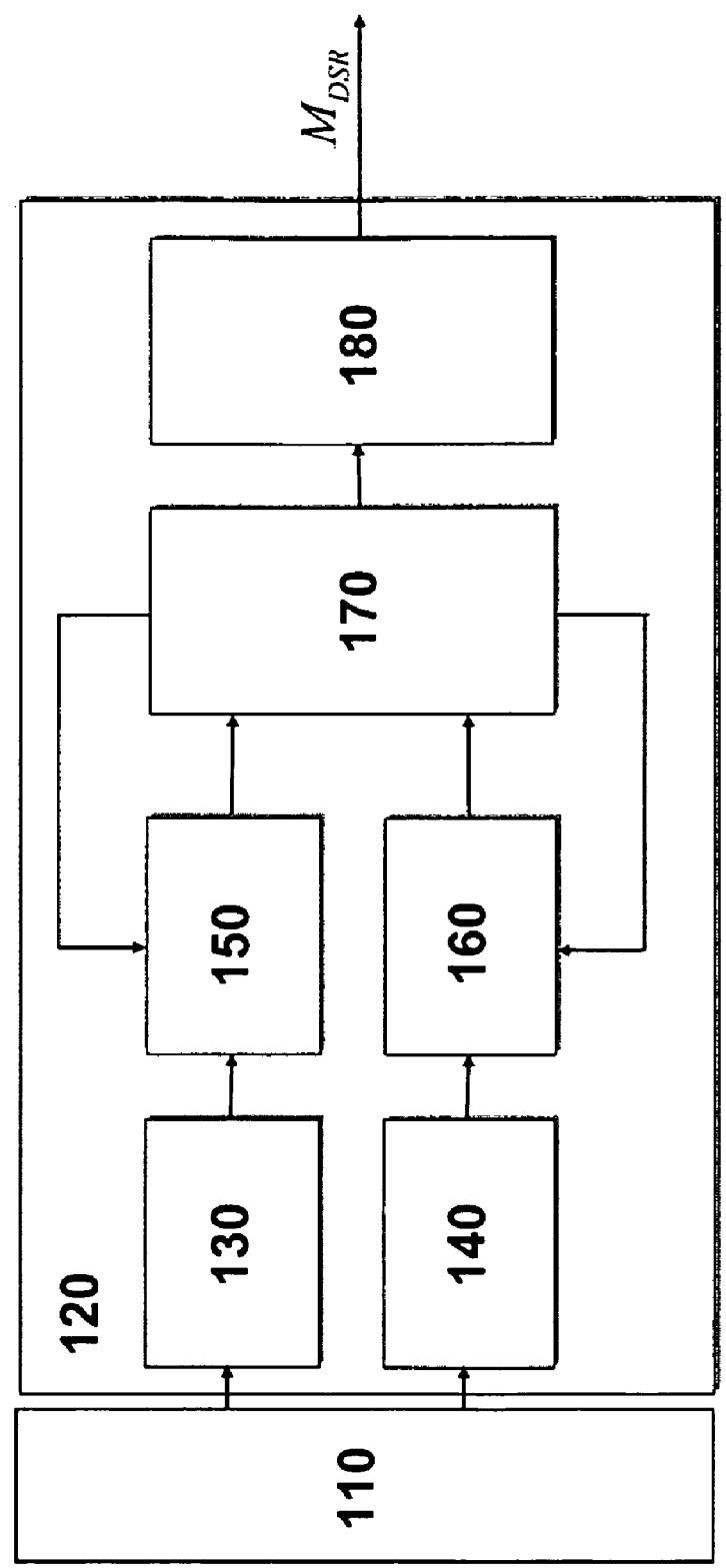
FIG. 1 is a schematic view of a control system for detecting an additional steering torque.

Referring to FIG. 1, the principal design of a steering line control system 120 for establishing the additional steering torque request $M_{DSR}$ is illustrated in a survey. The functions comprise a detection of driving situations in blocks 130 and 140, a control adapted to the driving situation in blocks 150 and 160, a steering angle control in block 170 for determining an additional steering torque $\Delta M$, and a situation-responsive limitation of the additional steering torque $\Delta M$ in block 180. The steering torque request $M_{DSR}$ of the control system 120 is achieved from the limited additional steering torque $\Delta M$. The steering torque introduced into the steering line by the EPS servo motor corresponding to the steering torque request $M_{DSR}$ assists the driver in adjusting a nominal steering angle $\delta_{nominal}$ at the steerable wheels of the vehicle, which is used to stabilize the vehicle in an unstable driving condition.

To detect driving situations, access is made to driving dynamics variables which are measured by sensors of the vehicle and to estimated ones, as well as to brake variables which are made available by a driving dynamics control 110 that may concern a yaw rate control ESP (Electronic Stability Program) and/or an anti-lock system (ABS).

Block 130 is provided to detect a braking operation on an inhomogeneous roadway, which is also referred to as μ-split braking, while block 150 corresponds to a control component of the control system for determining the additional steering torque $\Delta M$, which is established herein dependent on the disturbance yaw torque $M_Z$ induced by the brake intervention. A possible extension in this respect is shown in blocks 140 and 160 and relates to situations in which a vehicle is understeering or oversteering. These situations can be detected in block 140, and the control component 160 of the control system can perform an adapted control of the intervention in this case. The additional steering torque may be determined then e.g. dependent on a difference between the yaw rate $\dot{\psi}$ of the vehicle and a reference yaw rate established by way of a vehicle model.

Figure 2:
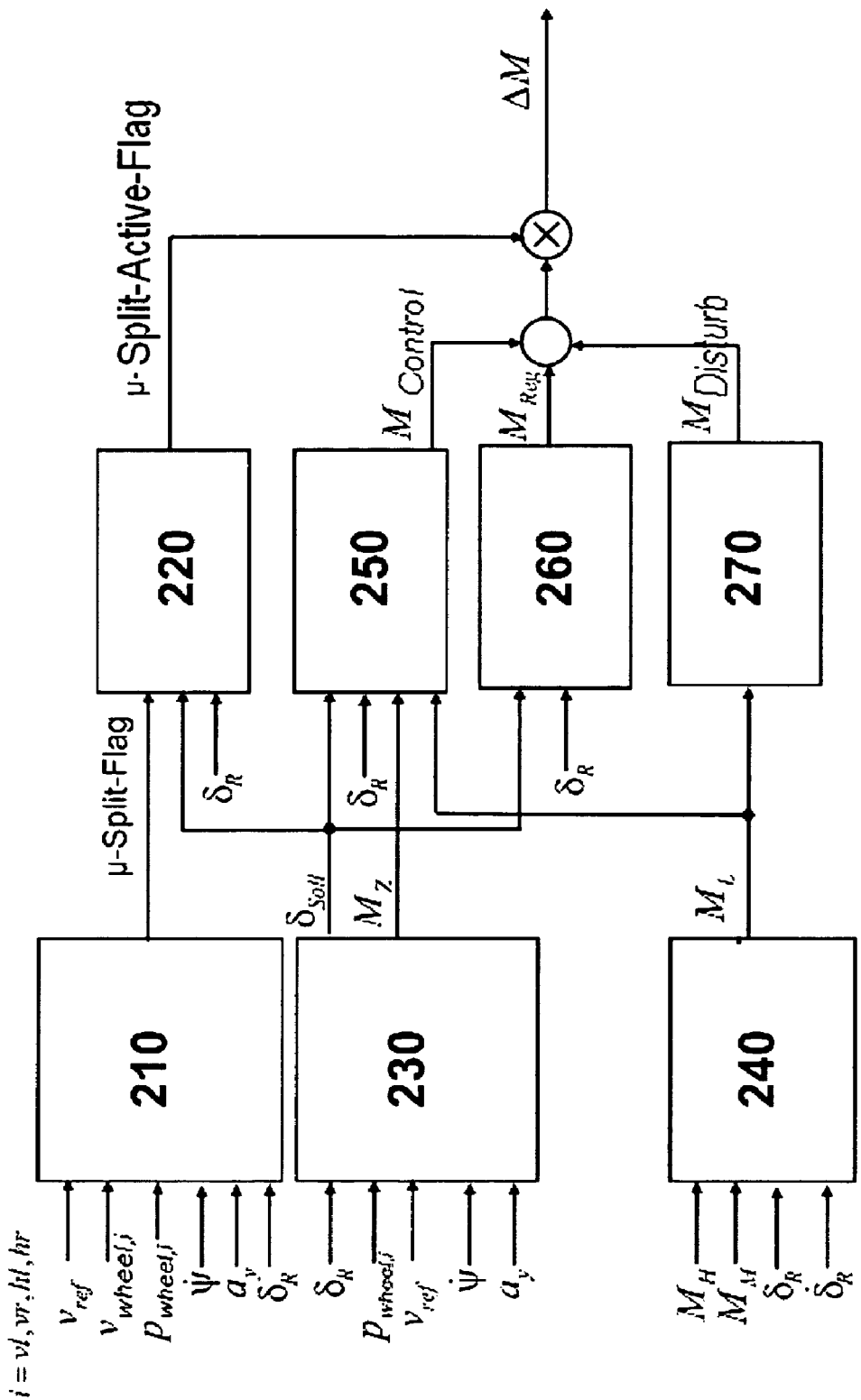
FIG. 2 is a block diagram with a general outlay of a control system for establishing an additional steering torque in a braking operation on an inhomogeneous roadway.

The block diagram in FIG. 2 shows a favorable embodiment of a regulating and control system for steering angle control in a μ-split braking operation. This system comprises in particular a block 210 for detecting a μ-split braking operation, a block 220 which comprises a logic circuit for activating the control system, a block 230 for determining a nominal steering angle $\delta_{nominal}$, a block 240 for estimating a load moment $M_L$ that acts on the steering line, a block 250 for the pilot torque control, a steering angle controller 260, as well as a block 270 for the disturbance variable feed-forward.

A μ-split flag, which adopts the value 1 when a μ-split braking operation is detected, is produced as an output signal in block 210 in order to detect μ-split braking. Otherwise, the μ-split flag adopts the value 0.

Especially the yaw rate $\dot{\psi}$ of the vehicle, which can e.g. be measured by means of a yaw rate sensor, the lateral acceleration $a_y$ of the vehicle which can e.g. be measured by means of a lateral acceleration sensor, as well as the steering angle $\delta_R$ which prevails at the steerable wheels of the vehicle, can be used as input signals of block 210. This steering angle can be determined by way of known transmission ratios from the measured steering angle $\delta_L$ at the steering column and from the measured control angle $\delta_M$ of the EPS servo motor.

From these input signals, it is then established whether the vehicle is traveling straight ahead or is cornering. Cornering is detected e.g. when values of these input signals exceed a predetermined threshold value, and it can be established by way of the signs of these signals whether the curve is a right-hand curve or a left-hand curve. The detection of straight travel accordingly takes place when the values of the mentioned input signals are lower than predetermined threshold values.

A braking operation on an inhomogeneous roadway is detected in block 210 by way of the reference speed $v_{ref}$ of the vehicle, as well as by way of wheel speeds $v_{wheel,i}$ and brake pressures $p_{wheel,i}$ in the wheel brakes at the right front wheel (i=fr), at the left front wheel (i=fl), at the right rear wheel (i=rr), and at the left rear wheel (i=rl).

In particular, longitudinal slip of the wheel i can be established by a comparison of the wheel speed $v_{wheel,i}$ and the vehicle reference speed $v_{ref}$ which indicates in which extent the wheel tends to lock. An analog detection of the driving situation and in particular the longitudinal slip of a wheel is performed to activate an ABS-control which prevents wheel lock by maintaining or reducing the brake pressure $p_{wheel,i}$. The rules that will be described hereinbelow can be used to detect a μ-split situation and in particular to determine the μ-split flag. These rules are based on the initially described ABS control strategy of yaw torque limitation at the front axle and the 'select-low' at the rear axle.

The μ-split flag is set from the value 0 to the value 1 during straight travel when one of the following conditions is satisfied:
a) one front wheel undergoes ABS control for a predefined duration, while the other front wheel is not in ABS control.
b) Both front wheels undergo ABS control, and a difference of the brake pressures $p_{wheel,i}$ at the front wheels exceeds a predetermined threshold value.
c) Both front wheels are in ABS control for a predefined duration, an ABS locking pressure on at least one front wheel exceeds a predetermined threshold value, and the ABS locking pressure at one front wheel amounts to a predetermined multiple of the locking pressure of the other front wheel.

The μ-split flag is set from the value 1 to the value 0 during straight travel when one of the following conditions is sastisfied:
a) No front wheel undergoes ABS control.
b) The ABS locking pressure on both front wheels is lower than a predefined threshold value for a predetermined duration.
c) The ABS locking pressure of a front wheel amounts to less than a predetermined multiple of the ABS locking pressure of the other front wheel.

In a cornering maneuver, the μ-split flag is set from value 0 to value 1 when one of the following conditions is satisfied:
a) The outside wheel in a curve enters ABS control prior to the inside wheel in a curve.
b) Both front wheels undergo ABS control for a predefined duration, and at least one front wheel exhibits an ABS locking pressure which exceeds a predetermined threshold value, and the ABS locking pressure at the curve-inward front wheel amounts to at least a predetermined multiple of the ABS locking pressure of the curve-outward front wheel.

The μ-split flag is set from the value 1 to the value 0 during cornering when one of the following conditions is satisfied:
a) None of the front wheels undergoes ABS control.
b) The ABS locking pressure on both front wheels is lower than a predefined threshold value for a predetermined period.
c) The ABS locking pressure at the curve-inward front wheel is lower than a predetermined multiple of the ABS locking pressure at the curve-outward wheel.

The μ-split flag is used as an input signal for the block 220, which comprises the activation logic for the control system.

When the ignition is re-started, a μ-split active flag, which represents the output signal of block 220, is set to the value 0. A change to the value 1 takes place in particular when the μ-split flag adopted the value 1.

However, it is preferably required that likewise one or more additional conditions are satisfied so that the μ-split active flag adopts the value 1. Such conditions are e.g. investigated in a μ-split situation likewise for the activation of an ABS control or a yaw torque compensation by means of an ESP system.

For example, the μ-split flag is set to the value 1 when additionally a difference of the coefficient of friction for wheels on the right side and the left side, which is estimated in an ABS controller, exceeds a predefined threshold value, and/or when the deviation between the steering angle $\delta_R$ and the calculated nominal steering angle $\delta_{nominal}$ exceeds a predefined threshold value. Besides, the results of a driving situation detection operation, which latter is performed in an ABS and/or ESP system, can be taken into consideration in the activation logic.

The μ-split active flag is reset from the value 1 to the value 0, when the μ-split flag adopts the value 0 or one or more of the other conditions considered are no longer satisfied. As regards conditions which are founded on a comparison of a variable with a threshold value, preferably other threshold values are used than in the activation before so that the control is calmed down by a hysteresis.

Figure 3:
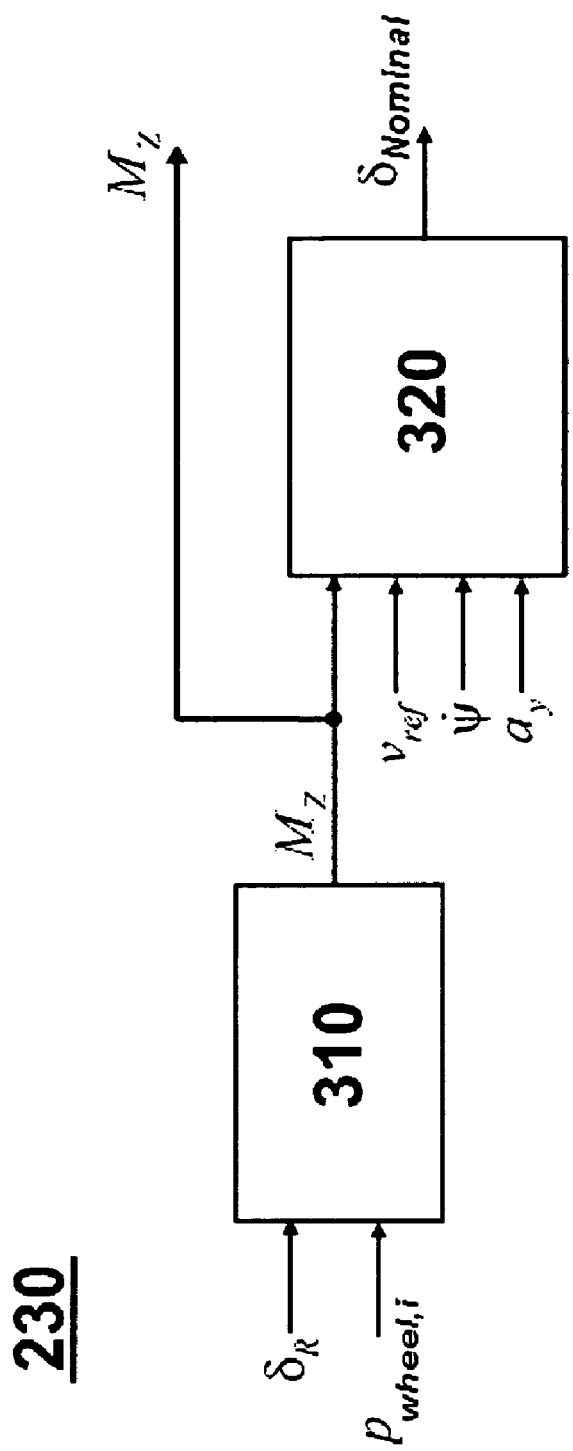
FIG. 3 is a development of a block of the block diagram illustrated in FIG. 2 for determining a nominal steering angle.
Figure 4:
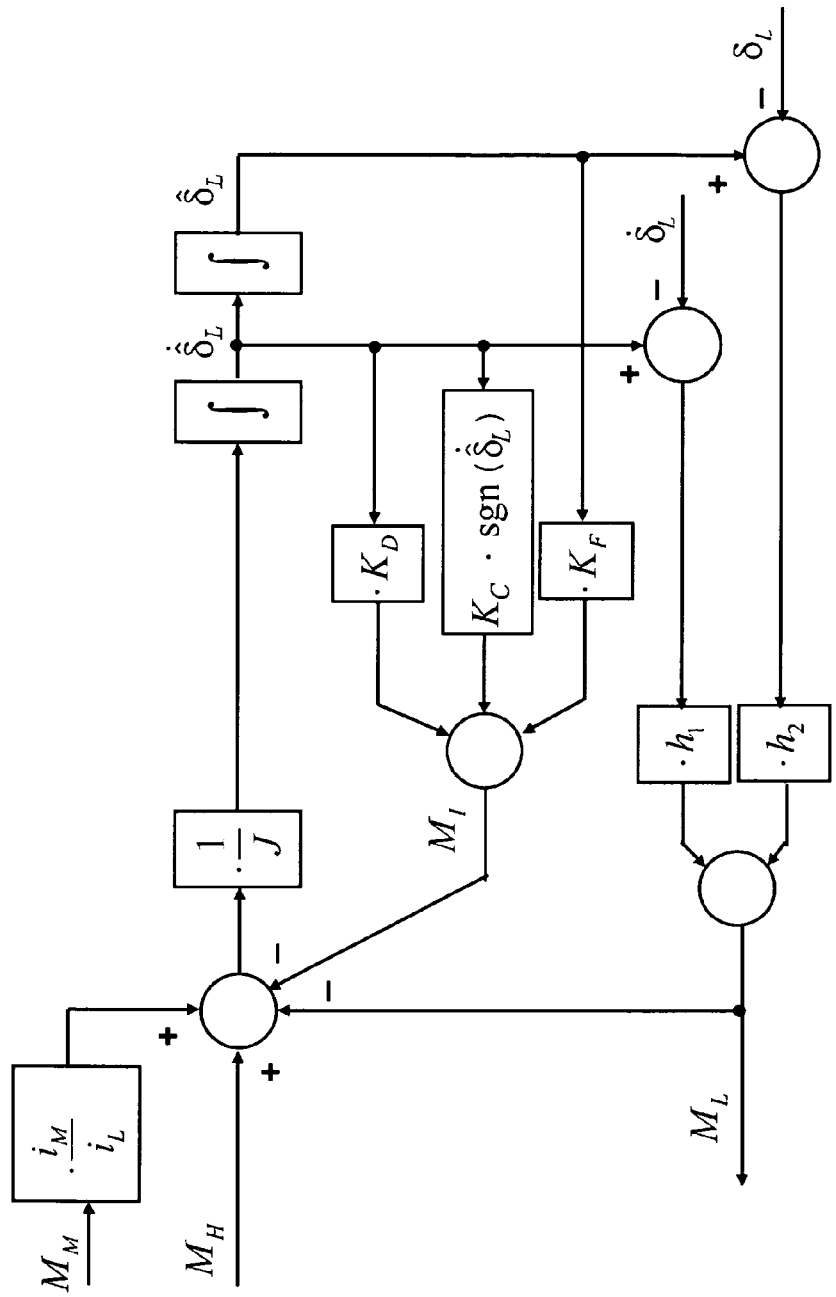
FIG. 4 is a first development of a block of the block diagram illustrated in FIG. 2 to estimate the load moment.

The nominal steering angle $\delta_{nominal}$ is determined in block 230, whose input signals reflect the steering angle $\delta_R$ at the steerable wheels of the vehicle, the brake pressures $p_{wheel,i}$ at the wheel brakes as well as the reference speed $v_{ref}$ the yaw rate $\dot\psi$ and the lateral acceleration $a_y$ of the vehicle. A preferred embodiment of this block is illustrated as a block diagram in FIG. 3.

A disturbance yaw torque $M_Z$ is estimated in block 310 which is brought about by the differing brake forces $F_{x,i}$ (i=fr, fl, rr, rl) at the wheels of the vehicle in a μ-split situation.

It is achieved from a condition of equilibrium for torques about the vertical axis of the vehicle:

$$M_Z = \cos(\delta_R) \cdot \{s_l \cdot F_{x,vl} - s_r \cdot F_{x,vr}\} - \sin(\delta_R) \cdot l_v \cdot \{F_{x,hl} - F_{x,hr}\} + s_l \cdot F_{x,hl} - s_r \cdot F_{x,hr} \quad (1)$$

Herein, $s_l$ designates the distance between the center of gravity of the vehicle and the left wheel contact point in the vehicle's transverse direction; $s_r$ designates the distance between the center of gravity of the vehicle and the right wheel contact in the vehicle's transverse direction; and $l_v$ designates the distance between the center of gravity of the vehicle and the front axle in the vehicle's longitudinal direction.

In a favorable embodiment of the invention, ABS control prevents locking of the wheels of the vehicle. Thus, a linear relationship between the brake forces $F_{x,i}$ at the wheels and the brake pressures $p_{wheel,i}$ in the wheel brakes is assumed so that the brake forces $F_{x,i}$ are determined by way of the following relation:

$$F_{x,i} = K_{pi} \cdot p_{wheel,i} \; (i=fr, fl, rr, rl) \quad (2)$$

The proportionality constants $K_{pi}$ are then determined e.g. in driving tests and stored in block 310.

On the basis of the disturbance yaw torque $M_Z$, which is transmitted from block 310 to block 320, a first component $\delta_{nominal,1}$ of the nominal steering angle $\delta_{nominal}$ is determined in an inverse vehicle model, and preferably a linear single-track model is made the basis in this case. In this arrangement, the relationship between disturbance yaw torque $M_Z$ and steering angle is linearized for a stationary driving condition.

The first nominal steering angle component $\delta_{nominal,1}$ is therefore established by multiplication of the disturbance yaw torque $M_Z$ with an appropriate amplification factor $K_M$:

$$\delta_{nominal,1} = K_M \cdot M_Z \quad (3)$$

It has shown that the relationship in equation 3 includes dependencies on the vehicle speed $v_{ref}$ and the brake pressures $p_{wheel,i}$. Consequently, the amplification factor $K_M$ is determined dependent on these variables, for example, by means of characteristic curves which are established in driving tests.

It has also shown that the brake pressures $p_{wheel,rr}$ and $p_{wheel,rl}$ in the wheel brakes of the rear axle have only little influence. Further, the brake pressures $p_{wheel,fr}$ and $p_{wheel,fl}$ can be united in the wheel brakes of the front axle. In a preferred embodiment of block 320, the nominal steering angle component $\delta_{nominal,1}$ is therefore determined on the basis of a relation in the following form:

$$\delta_{nominal,1} = K_M(v_{ref}\{p_{wheel,fl}+p_{wheel,fr}\}/2)\cdot M_Z \quad (4)$$

Erroneous calculations of the nominal steering angle $\delta_{nominal}$ could occur, in particular due to varying operating conditions of the vehicle brakes such as varying operating temperatures or progressive wear of the brake linings, or due to inaccuracies in the determination of the brake pressures $p_{wheel,i}$ in the wheel brakes, if only the nominal steering angle component $\delta_{nominal,1}$ that is established by way of equation 4 was taken into consideration.

It is therefore arranged for to determine a second nominal steering angle component $\delta_{nominal,2}$ in which the actual reaction of the vehicle to steering movements of the driver is taken into account. It has shown that the vehicle can be stabilized in an especially effective manner when the second nominal steering angle component $\delta_{nominal,2}$ is established from a deviation of a yaw angle $\psi$ of the vehicle from a predefined threshold value $\psi_{th}$.

The yaw angle $\psi$ is determined in an appropriate embodiment of the invention by integration of the measured yaw rate $\dot{\psi}$, which is performed under the condition that the vehicle is traveling straight. Thus, an initial value of $\psi_0=0$ for the yaw angle $\psi$ can be made the basis of the integration.

A check is made in block 320 by a continuous comparison of the input signals $\delta_R$, $a_y$ and $\dot{\psi}$ with associated threshold values during a period $\Delta t_{case\ history}$ before the start of the braking operation at time $t_o$, whether the vehicle is traveling straight.

In a preferred realization in which a calculation cycle of the length $\Delta t_{Loop}$ is assumed, it is arranged for that the integration of the yaw rate $\dot{\psi}$ with the initial value $\psi_0=0$ is performed if the conditions $$|\delta_R|<\delta_0,\ |a_y|<a_0\ \text{and}\ |\dot{\psi}|<\dot{\psi}_0$$

are satisfied for a predetermined number $n=\Delta t_{case\ history}/\Delta t_{Loop}$ of calculation cycles prior to the start of the braking operation at time $t_0$, with $\delta_0$, $a_0$ and $\dot{\psi}_0$ being predefined threshold values.

The yaw angle is calculated in the $k^{th}$ calculation cycle beginning with the start of the braking operation in block 320 by means of the relation $$\psi_{k+1}=\dot{\psi}_k\cdot \Delta t_{loop}+\psi_k \quad (5)$$

However, any other integration method known to the expert in the art may also be employed.

The second nominal steering angle component $\delta_{nominal,2}$ is preferably considered when the amount of the yaw angle $\psi$ established by way of equation 5 exceeds a predetermined threshold value $\psi_{th}$. It is achieved in an advantageous embodiment of the invention from the deviation between the yaw angle $\psi$ and the threshold value $\psi_{th}$ and an appropriately chosen amplification factor $K_\psi$, which is e.g. established in driving tests:

$$\delta_{nominal,2} = \begin{cases} -K_\psi\cdot(\psi-\psi_{th}), & \psi>\psi_{th} \\ -K_\psi\cdot(\psi+\psi_{th}), & \psi<-\psi_{th} \\ 0 & \text{otherwise} \end{cases} \quad (6)$$

The nominal steering angle $\delta_{nominal}$ results in a μ-split braking operation during straight travel, preferably as a sum of the two nominal steering angle components $\delta_{nominal,1}$ and $\delta_{nominal,2}$:

$$\delta_{nominal}=\delta_{nominal,1}+\delta_{nominal,2} \quad (7)$$

In a μ-split braking operation during cornering, it is preferably intended to omit considering the second nominal steering angle component $\delta_{nominal,2}$ which is determined under the conditions of braking during straight travel.

Besides, the steering angle, i.e. the nominal steering angle $\delta_{nominal,curve}$ which the driver has to adjust in a μ-split braking operation during cornering, can be subdivided into a first component for compensation of the disturbance yaw torque $M_Z$ and a second component $\delta_{track}$, which latter corresponds to the actual track steering angle.

However, the track steering angle cannot be measured in the situation under review, but is found out in a vehicle model. Preferably, the linear single-track model again provides the basis, in which the following relationship applies in a steady-state cornering maneuver, where EG designates the self-steering gradient:

$$\delta_{track}=\left(\frac{l}{v_{ref}^2}+EG\right)a_y \quad (8)$$

In conformity with this equation, the track steering angle $\delta_{track}$ is determined in block 320 from the input signals $v_{ref}$ and $a_y$.

It has shown that a continuous calculation of the track steering angle $\delta_{track}$ during the braking operation can cause inaccuracies, which are especially due to the fact that the lateral acceleration $a_y$ is influenced by the brake intervention.

Therefore, it has proven favorable to found the determination of the nominal steering angle $\delta_{nominal,curve}$ on the track steering angle $\delta_{track}(t_0)$ which prevails at the start of the braking operation at time $t_0$.

It is, however, possible to perform steering angle control in a curve only for a limited duration when no significant change in the track steering angle desired by the driver has to be expected.

In the capacity of a nominal steering angle component for the compensation of the disturbance yaw torque $M_Z$, which latter is caused by the different brake forces during the braking operation, it is also possible to use the nominal steering angle component $\delta_{nominal,1}$ for a μ-split braking operation during cornering, which is established in block 320 in the fashion described hereinabove.

The nominal steering angle component $\delta_{nominal,curve}$ which is determined in a braking operation during cornering is composed additively of the nominal steering angle component $\delta_{nominal,1}$ and the track steering angle $\delta_{track}$ at the time $t_0$:

$$\delta_{nominal,curve}=\delta_{track}(t_0)+\delta_{nominal,1} \quad (9)$$

The situation-responsive nominal steering angle $\delta_{nominal}$ or $\delta_{nominal,curve}$ which is established in block 230 in the way described above, is transmitted to the activation logic in block 220, to block 250 for the pilot torque control, and to the steering angle controller 260.

Block 240 in FIG. 2 is used to estimate the load moment $M_L$, which counteracts the steering movements of the operator and by which a tire resetting moment is taken into consideration, which is caused by the cornering force and by transverse forces at the tire. On the basis of the load moment $M_L$, it is thus possible to consider the prevailing road conditions and, more particularly, the momentary road pavement in the control system. Thus, it is e.g. possible to adjust a lower steering torque $M_{DSR}$ when braking on an icy roadway than when braking on asphalt.

A preferred development of block 240 is shown as a block diagram in the Figure.

The load moment $M_L$ is then determined from the hand moment $M_H$, the motor moment $M_M$ of the EPS servo motor, as well as the steering angle $\delta_L$ that is related to the steering column and adjusted by the driver, as well as its change rate $\dot{\delta}_L$. As has been explained hereinabove, the hand steering moment $M_H$ is measured at the steering rod. The motor moment $M_M$ of the EPS servo motor is measured or determined from an operational quantity of the motor such as the motor current. It is also possible to use the nominal motor torque which is produced by the EPS control unit, when it is safeguarded that this quantity is adjusted by the EPS system with a sufficient rate of precision and dynamics.

To convert the variables with regard to a joint reference point within the steering line, the ratio of transmission $i_L = \delta_L/\delta_R$ between the steering angle $\delta_L$ related to the steering column and the steering angle $\delta_R$ related to the steerable wheels, and the ratio of transmission $i_M = \delta_M/\delta_R$ between the control angle $\delta_M$ of the shaft of the EPS servo motor and the steering angle $\delta_R$ at the steerable wheels are used. An evaluation with reference to the steering column is assumed in the following.

The determination of the load moment $M_L$ corresponds to a detection by a so-called disturbance variable observer unit. A model of the steering line is described by the following equation:

$$\ddot{\delta} = \frac{(M_M \cdot i_M / i_L + M_H - M_I - M_L)}{J} \tag{10}$$

In this respect, $\ddot{\hat{\delta}}_L$ designates an estimated steering angle acceleration, and J refers to the moment of inertia of the steering line.

The hand moment $M_H$ and the engine torque $M_M$ of the EPS servo motor act corresponding to the model equation 10 in the same direction, while an inner steering torque $M_I$ and the load moment $M_L$ act in opposition thereto.

Due to the inner steering torque $M_I$, any moments caused by viscous (Stoke) and Coulomb friction inside the steering line, which develop due to sliding on lubricated and dry contact surfaces, as well as resetting moments (spring effect) accompanying an excursion are taken into account so that an expression of the following force is made the basis:

$$M_I = K_S \cdot \dot{\hat{\delta}}_L + K_C \cdot \text{sign}(\dot{\hat{\delta}}_{LS}) + K_F \cdot \hat{\delta}_L \tag{11}$$

The constants $K_S$, $K_C$ and $K_F$ are established in driving tests.

The estimated steering angle velocity $\dot{\hat{\delta}}_L$ as well as the estimated steering angle $\hat{\delta}_L$ are determined by integration from the estimated steering angle acceleration $\ddot{\hat{\delta}}_L$:

$$\dot{\hat{\delta}}_L = \int \ddot{\hat{\delta}}_L dt \text{ and } \hat{\delta}_L = \int \dot{\hat{\delta}}_L dt \tag{12}$$

An assessed value for the load moment $M_L$, which is fed back to the input of the disturbance variable observer unit, is achieved from the difference between the estimated steering angle velocity $\dot{\hat{\delta}}_L$ and the measured steering angle velocity $\dot{\delta}_L$ as well as from the difference between the estimated steering angle $\hat{\delta}_L$ and the measured steering angle $\delta_L$:

$$M_L = h_1 \cdot (\dot{\hat{\delta}}_L - \dot{\delta}_L) + h_2 \cdot (\hat{\delta}_L - \delta_L) \tag{13}$$

The amplification factors $h_1$ and $h_2$ are determined in driving tests so that the system is especially stable and sufficiently exact values of the load steering moment $M_L$ can be determined.

Figure 5:
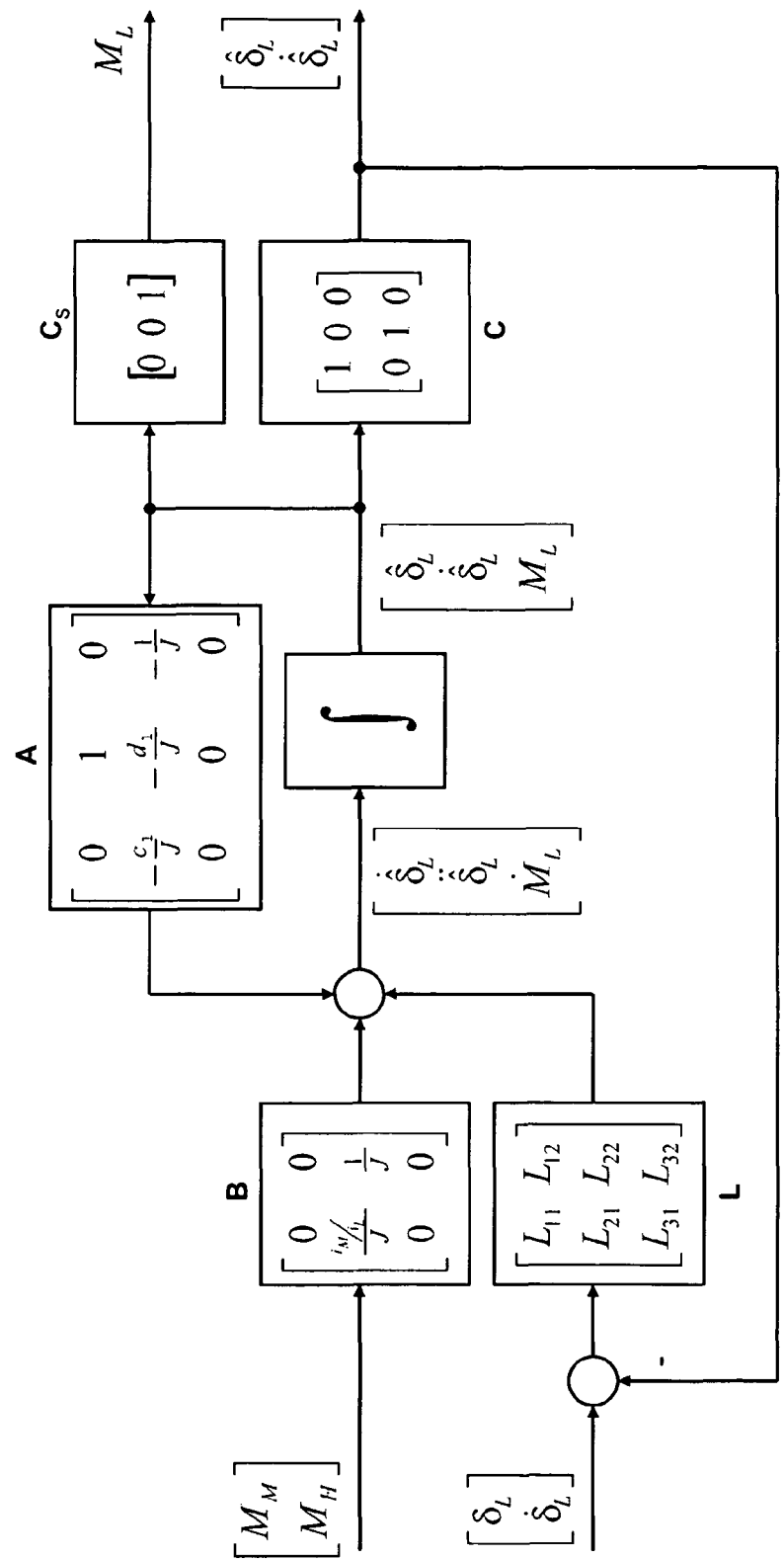
FIG. 5 is a second development of a block of the block diagram illustrated in FIG. 2 to estimate the load moment.

FIG. 5 illustrates an additional preferred development of block 240 for the load moment estimation. A linear model of the steering line is used herein, in which the non-linear term of the above-mentioned model hat refers to the Coulomb friction within the steering line is not considered.

Thus, the inner steering torque $M_I$ in this model has the form:

$$M_I = c_1 \hat{\delta}_L + d_1 \dot{\hat{\delta}}_L \tag{14}$$

The proportionality constants $c_1$ and $d_1$ can again be established in driving tests.

The estimated steering angle acceleration $\ddot{\hat{\delta}}_L$ is calculated by way of the model equation 10 also in this embodiment of block 240, and the inner steering torque $M_I$ indicated in equation 14 is made the basis in this case.

A first integration permits achieving from this the estimated value $\dot{\hat{\delta}}_L$ for the steering angle velocity $\dot{\delta}_L$, while further integration furnishes an estimated steering angle $\hat{\delta}_L$ from the estimated steering angle velocity $\dot{\hat{\delta}}_L$.

In the disturbance variable observer unit in the embodiment illustrated in FIG. 5, the time derivative $\dot{M}_L$ of the estimated load moment $M_L$ is established from the difference between the estimated steering angle $\hat{\delta}_L$ and the measured steering angle $\delta_L$ and from the difference between the estimated steering angle velocity $\dot{\hat{\delta}}_L$ and the steering angle velocity $\dot{\delta}_L$, which is derived from the measured values of a steering angle sensor, being fed back to the input of the disturbance variable observer unit by way of an amplification matrix L. It is thus applicable:

$$\dot{M}_L = L_{31}(\hat{\delta}_L - \delta_L) + L_{32}(\dot{\hat{\delta}}_L - \dot{\delta}_L) \tag{15}$$

The estimated load moment $M_L$ is achieved from its time derivative $\dot{M}_L$ by integration.

In addition, it is possible to use the amplification matrix L in order to adapt the estimated steering angle acceleration $\ddot{\hat{\delta}}_L$ and the estimated steering angle velocity $\dot{\hat{\delta}}_L$ directly on the basis of the differences between the estimated variables $\hat{\delta}_L$ as well as $\dot{\hat{\delta}}_L$ and the corresponding variables $\delta_L$ and $\dot{\delta}_L$ established from test signals.

Standard methods of the control theory can be used to rate the amplification factors $L_{ij}$ of the amplification matrix L. They can be established by pole placement, for example.

Multiplication with a factor $i_L$ allows relating the load moment $M_L$, which is determined in block 240 so as to be initially related to the steering rod, to the steerable wheels of the vehicle.

The estimated load moment $M_L$ is submitted to block 250 for the pilot torque control and to block 270 for disturbance variable feed-forward.

In block 250, a control component $M_{control}$ of the additional steering torque is determined dependent on the load steering moment $M_L$. This control component is preferably composed of a 'direct' component $M_{control,0}$ and another component, which is proportional to the difference between the steering angle $\delta_R$ adjusted by the driver at the steerable wheels of the vehicle and the nominal steering angle $\delta_{nominal}$, and the nominal steering angle $\delta_{nominal,curve}$ is made the basis in a μ-split braking operation during cornering:

$$M_{control} = M_{control,0} \cdot \mathrm{sgn}(\delta_{nominal} - \delta_R) + m_{control} \cdot (\delta_{nominal} - \delta_R) \quad (16)$$

It is arranged for in this case to adjust the pilot control torque $M_{control}$ at the commencement of a braking operation on an inhomogeneous roadway in order to alert the driver to the existing hazard situation by means of a noticeable pulse and to simultaneously indicate to him in which direction he must steer for stabilizing the vehicle. The factor $\mathrm{sgn}(\delta_{nominal} - \delta_R)$ in equation 16 safeguards that the direct component of the pilot control torque $M_{control}$ has the correct sign.

According to a predetermined duration $\Delta t_{control}$, which commences with the start of the braking operation at time $t_0$, the control component $M_{control}$ of the additional steering torque is withdrawn so that the following time behavior results for the control component $M_{control}$:

$$M_{control}(t) = \begin{cases} M_{control}, & t_0 < t < t_0 + \Delta t_{control} \\ 0 & \text{otherwise} \end{cases} \quad (15)$$

Further, it has shown that the intervention on the basis of the pilot control torque $M_{control}$ can be performed in an especially comfortable fashion for the driver when the value of the factors $M_{control,0}$ and $m_{control}$ is reduced with decreasing vehicle speed $v_{ref}$ and increased with rising load moment $M_L$. This corresponds to a comfortable adaptation of the pilot control torque $M_{control}$ to the driving situation and to the prevailing coefficient of friction of the roadway.

The factors $M_{control,0}$ and $m_{control}$ are therefore chosen in a preferred embodiment of the invention in the following form:

$$M_{control,0} = f(v_{ref}, M_L) = K_{M,0} + K_{M,1} \cdot (v_{M,0} - v_{ref}) + K_{M,2} \cdot M_L \quad (16)$$

$$m_{control} = f(v_{ref}, M_L) = K_{m,0} + K_{m,1} \cdot (v_{m,0} - v_{ref}) + K_{m,2} \cdot M_L \quad (17)$$

Figure 6:
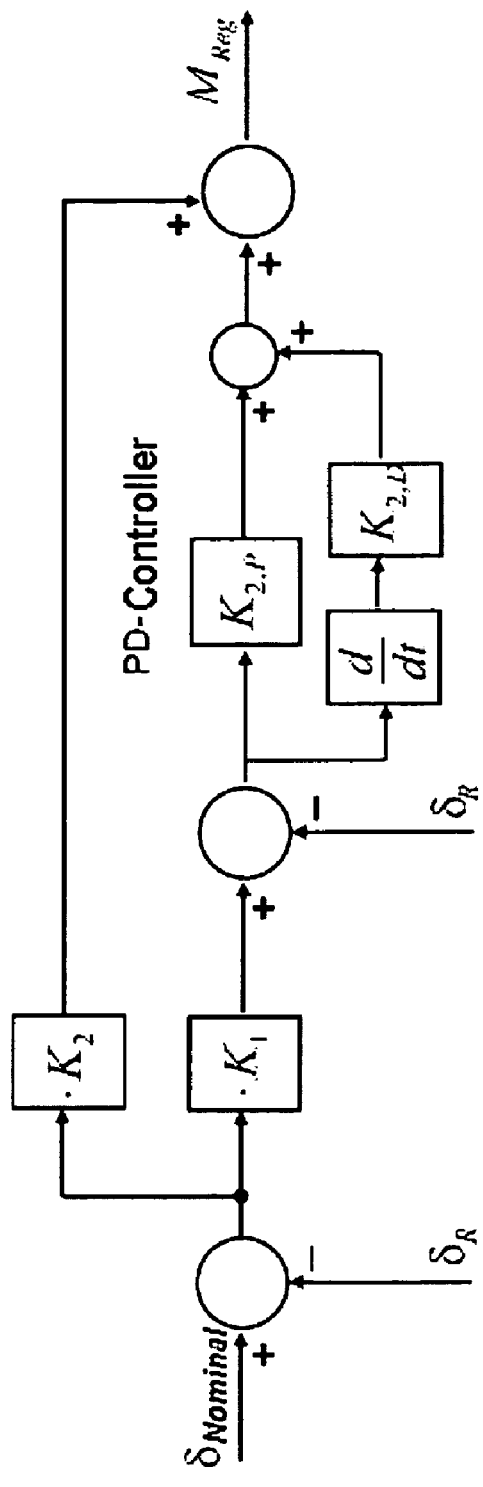
FIG. 6 is a development of a steering angle controller.

The constants $K_{i,j}$ (i=M,m; j=1,2,3) as well as the speed values $v_{M,0}$ and $v_{m,0}$ are determined in driving tests, for example. Controller 260 determines a control component $M_{Reg}$ of the additional steering torque $\Delta M$. FIG. 6 shows a block diagram of a favorable controller 260. The control component $M_{Reg}$ is additively composed of a first component and a second component in this embodiment of controller 260.

The first component is defined by an amplification of the deviation between the nominal steering angle $\delta_{nominal}$ and the instantaneously prevailing steering angle $\delta_R$ at the steerable wheels of the vehicle with a predetermined factor $K_2$ by means of a proportional controller.

The second component results from a deviation of the steering angle velocity $\dot{\delta}_R$ and is defined in a branch of the controller 260, which is designed as a cascade controller. The command variable for an inner controller is established by a multiplication of the deviation $\delta_{nominal} - \delta_R$ of the steering angle with a predefined factor $K_1$ and corresponds to a nominal steering angle variation. The deviation results from the difference $K_1(\delta_{nominal} - \delta_R) - \dot{\delta}_R$ between the nominal steering angle variation and the measured steering angle velocity $\dot{\delta}_R$.

The inner controller of the cascade controller is preferably designed as a PD controller so that the second component of the control component $M_{reg}$ of the additional steering torque is achieved as follows:

$$K_{2,P} \cdot [K_1 \cdot (\delta_{Soll} - \delta_R) - \dot{\delta}_R] + K_{2,D} \cdot \frac{d}{dt}[K_1 \cdot (\delta_{Soll} - \delta_R) - \dot{\delta}_R] \quad (18)$$

This second component of the control component $M_{reg}$ of the additional steering torque renders it possible for the control system to intervene very quickly and effectively, when the difference between the nominal steering angle $\delta_{nominal}$ and the instantaneous steering angle $\delta_R$ is increased by steering movements of the driver. The amplifications $K_{2,P}$ and $K_{2,D}$ are established in driving tests.

Figure 7:
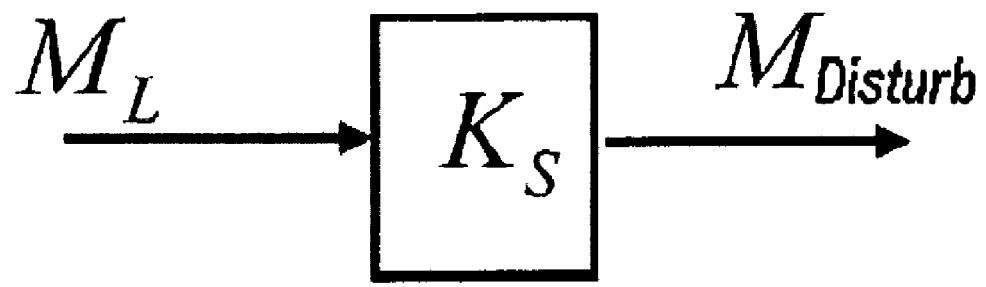
FIG. 7 is a first development of a block of the block diagram illustrated in FIG. 2 for the pilot torque control.

Another component $M_{disturb}$ of the additional steering torque $\Delta M$ results from the estimated load steering moment $M_L$ amplified by factor $K_S$ and is determined in block 270, which is illustrated in a preferred embodiment in a block diagram in FIG. 7.

The consideration of the component $M_{disturb}$ corresponds to a disturbance variable feed-forward, which allows considering the road conditions in this case, yet enables performing steering angle control in a simple fashion irrespective of this influence.

The components $M_{control}$, $M_{reg}$, and $M_{disturb}$ add to determine the additional steering torque $\Delta M$. Further, the sum is multiplied by the μ-split active flag, which is defined by the activation logic in block 240, so that the steering torque request $M_{DSR}$ exists only when the μ-split active flag assumes the value 1.

Figure 8:
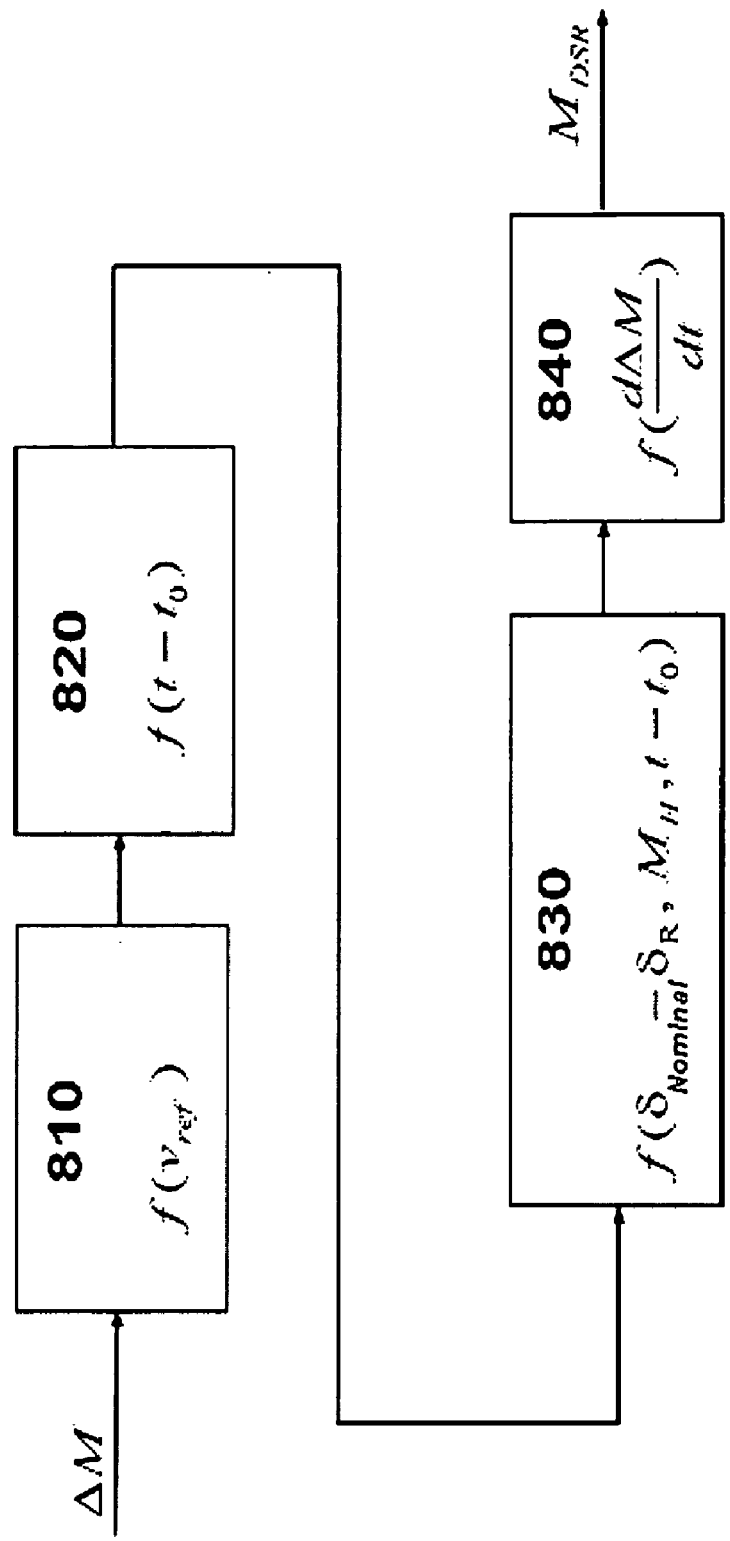
FIG. 8 is a block diagram describing the limitation of the additional steering torque.

To determine the steering torque request $M_{DSR}$, limitation of the additional steering torque $\Delta M$ is provided, which is performed dependent on the instantaneous driving condition and the instantaneous driver behavior. FIG. 8 shows a block diagram of a preferred limitation component.

A speed-responsive limitation takes place in block 810, and a greater limitation of the additional steering torque $\Delta M$ takes place in a lower speed range than in a medium speed range. It has shown that operators consider a like speed-responsive limitation as especially comfortable. The additional steering torque $\Delta M$ is significantly limited in high-speed ranges because interventions due to errors in the behavior of the operator of the vehicle can cause major damage in these ranges.

The limitation within block 810 is preferably carried out by way of a characteristic curve, which is e.g. defined in driving tests.

Block 820 diminishes the additional steering torque $\Delta M$ with an increasing duration of the control intervention. It is hereby prevented that control interventions are erroneously performed due to an increasing rate of errors in defining the input variables such as brake pressures $p_{wheel,i}$, or due to an increasing number of incorrect ratings, e.g. in estimating the track steering angle $\delta_{track}$ in a braking operation while cornering. Usually the operator of the vehicle, when he is alerted to the hazard situation after a defined duration of the intervention and instructed to stabilize the vehicle, will be able to fully take over the task of steering angle control.

Further, a limitation is envisaged, which takes the behavior of the vehicle operator into account. In block 830, it is established from the hand steering torque $M_H$ and from the instantaneous deviation of the steering angle $\delta_{nominal} - \delta_R$, whether the operator follows the instructions of the control system, or whether he opposes them. In this arrangement, a temporally progressive consideration and evaluation of these variables allows forming a variable that is an indicator of the opposition of the driver. If this variable exceeds a predetermined threshold value, the additional steering torque $\Delta M$ is reduced until the value 0 in block 830.

Further, dynamics limitation is performed in block 840, in which the rise or fall of the additional steering torque ΔM is limited in order to prevent quick application of the additional steering torque to the steering wheel. Without this limitation, it would be possible with a very high dynamics of the EPS actuator that a sudden introduction of the additional steering torque hits the steering wheel out of the operator's hands.

The output signal of the limitation component illustrated in FIG. 8 is represented by a limited additional steering torque ΔM, which is the steering torque requirement $M_{DSR}$ submitted to the EPS servo motor. The latter introduces the steering torque $M_{DSR}$ into the steering line so that the driver is supported when countersteering in a μ-split situation.

This enables the driver to stabilize the vehicle more quickly, and it becomes possible to adapt the brake pressure in the wheel brakes on the high coefficient-of-friction side more quickly to the driver's specifications.

Hence, the vehicle can be stabilized more reliably and quickly by the control system shown during a μ-split braking operation. Thus, it is possible to shorten the stopping distance of the vehicle in such a situation.

The invention claimed is:

1. A method for assisting an operator of a vehicle in adjusting a nominal steering angle at steerable wheels of the vehicle for vehicle stabilization, the method comprising:
    determining a steering torque of a steering line of the vehicle dependent on a difference between the nominal steering angle and an instantaneous steering angle;
    estimating a value of a load moment acting on the steering line of the vehicle based upon a hand moment, a motor moment, a steering column steering angle and a steering angle velocity of a steering column; and
    applying an additional torque to the determined steering torque of the steering line of the vehicle, wherein the additional steering torque is established dependent on the estimated value for the load moment;
    wherein the additional steering torque is composed of at least two additive components, with a first component being determined dependent on the difference between the nominal steering angle and the instantaneous steering angle, and a second component is established dependent on the estimated value of the load moment.

2. A method according to claim 1, wherein the load moment is estimated by a disturbance variable observer unit.

3. A method according to claim 1, wherein a component of the nominal steering angle is determined in an inverse vehicle model dependent on a disturbance yaw torque.

4. A method according to claim 1, wherein a component of the nominal steering torque is determined dependent on a deviation between a yaw angle of the vehicle and a predetermined value of the yaw angle.

5. A method according to claim 1, wherein a component of the nominal steering angle is an estimated track steering angle.

6. A method according to claim 1, wherein a component of the additional steering torque has a predefined amount.

7. A method according to claim 6, wherein the component of the additional steering angle with the predefined amount is set for a predetermined duration after a start of a braking operation.

8. A device for assisting an operator of a vehicle in adjusting a nominal steering angle on at least one steerable wheel of the vehicle for vehicle stabilization, the device comprising:
    a control unit for determining a deviation between the nominal steering angle and an instantaneous steering angle of the vehicle;
    a torque adjusting device that adjusts an additional steering torque, wherein the additional steering torque is determined based on deviation between the nominal steering angle and the instantaneous steering angle;
    one or more sensors mounted in the steering line of the motor vehicle;
    an estimation device for estimating a load moment that acts on the steering line based on signals from the one or more sensors mounted in the steering line of the motor vehicle, wherein the load moment is vehicle based upon a hand moment, a motor moment, a steering column steering angle and a steering angle velocity of a steering column;
    a device for establishing at least one component of the additional steering torque for the estimated load moment; and
    an adder for adding the additional steering torque to the steering torque established by the deviation between the nominal steering angle and the instantaneous steering angle, wherein the torque adjusting device is driven by an output of the adder.

9. A device according to claim 8, wherein the one or more sensors includes at least one of a steering angle sensor, a sensor for measuring a hand steering moment representative of a steering request from the operator, and a sensor for measuring the additional steering torque.

10. A device according to claim 8, wherein the estimation device for estimating the load moment is designed as a disturbance variable observer unit.

11. A device according to claim 8, wherein the torque adjusting devices comprises a servo motor of an electric power steering system.

12. A device according to claim 8, wherein the torque adjusting device comprises a hydraulic power steering system.

13. A device according to claim 8, wherein the torque adjusting device comprises a steer-by-wire steering system.

14. A device according to claim 8, further comprising a pilot control which connects to the adder and transmits an additional steering torque with a predetermined value to the adder for a predetermined period.

15. A device according to claim 8, further comprising a detector for detecting a driving condition, wherein dependent on a detected driving condition the detector submits an activation signal to a multiplier, which multiplies the activation signal by the additional steering torque established.

16. A device according to claim 15, wherein the activation signal adopts a value of 1 when the detector identifies a braking operation on an inhomogeneous roadway.

\* \* \* \* \*